US006652897B1

(12) United States Patent
Stewart

(10) Patent No.: US 6,652,897 B1
(45) Date of Patent: Nov. 25, 2003

(54) DECORATING A CAKE WITH A PRINTED EDIBLE SHEET BY USING AN INK JET PRINTER

(75) Inventor: Douglas R. Stewart, Fort Gratiot, MI (US)

(73) Assignee: Jack Guttman, Inc., West Chester, OH (US)

( * ) Notice: Subject to any disclaimer, the term of this patent is extended or adjusted under 35 U.S.C. 154(b) by 0 days.

(21) Appl. No.: 09/122,262

(22) Filed: Jul. 24, 1998

Related U.S. Application Data

(60) Continuation of application No. 08/471,761, filed on Jun. 6, 1995, which is a division of application No. 08/088,125, filed on Jul. 7, 1993.

(51) Int. Cl.[7] .............................. A23P 1/08; A23G 3/00; A23L 1/275
(52) U.S. Cl. ..................... 426/383; 426/87; 426/132; 426/420
(58) Field of Search .................... 426/383, 87, 132, 426/420; 347/104, 106

(56) References Cited

U.S. PATENT DOCUMENTS

| 861,286 A | 7/1907 | Howard |
| 919,736 A | 4/1909 | Loesch |
| 2,394,322 A | 2/1946 | McKee |
| 2,895,832 A | 7/1959 | Bersey |
| 3,503,345 A | 3/1970 | Abrams |
| 3,778,515 A | 12/1973 | Ashley |
| 3,852,494 A | 12/1974 | Williamson |
| 3,889,591 A | 6/1975 | Noguchi |
| 4,024,287 A | 5/1977 | Golchert |
| 4,168,662 A | * 9/1979 | Fell ............................ 426/383 |
| 4,285,978 A | 8/1981 | Quinlivan |
| 4,322,449 A | 3/1982 | Voss et al. |
| 4,478,658 A | 10/1984 | Wittwer |

(List continued on next page.)

FOREIGN PATENT DOCUMENTS

| CA | 1258201 | 8/1989 |
| CA | 2022294 | 2/1991 |

(List continued on next page.)

OTHER PUBLICATIONS

Photographic p. 14, Sep. 1988.*
Rocky Mountain News p. 70, Oct. 14, 1988.*
Shead, J., "*Inks Ain't What They Used to Be*", Confec. Prod. vol. 58, No. 6, Jun. 1992, pp. 410,415. (abstract only).

(List continued on next page.)

Primary Examiner—Steve Weinstein
(74) Attorney, Agent, or Firm—Wood, Herron & Evans LLP

(57) ABSTRACT

An edible film and method of using same for decorating foodstuffs, in particular baked goods, wherein anyone can easily, inexpensively and artistically decorate foodstuffs. The edible film according to the present invention is composed of an edible polymer film which is preferably releasably mounted upon a flexible substrate to provide a reinforced edible film. The edible film is peelably released from the substrate to provide decorations for the foodstuff. The edible film may be decoratively prepared into predetermined decorations prior to distribution, which may include being pre-printed, pre-cut, colored, or being of pre-selected opacity and sheen. Pre-printing may be accomplished by any suitable printing process utilizing edible inks. Alternatively, the edible film may be distributed in a not yet finalized decoration form, wherein finalization is left up to the user. For example, the reinforced edible film may be distributed without being pre-printed or only partially pre-printed, wherein the user controls subsequent printing, writing, drawing or otherwise marking upon the edible film, such as by use of edible ink writing instruments. Further, the user may purchase sheets of the reinforced edible film and thereafter cut the reinforced edible film sheets into shapes defined by the user.

5 Claims, 2 Drawing Sheets

U.S. PATENT DOCUMENTS

| | | | |
|---|---|---|---|
| 4,531,292 A | 7/1985 | Pasternak | |
| 4,548,825 A | 10/1985 | Voss et al. | |
| 4,560,562 A | 12/1985 | Schroeder | |
| 4,578,273 A | 3/1986 | Krubert | |
| 4,594,276 A | 6/1986 | Relyea | |
| 4,843,958 A | 7/1989 | Egosi | |
| 4,859,476 A | 8/1989 | Herting | |
| 4,905,589 A | 3/1990 | Ackley | |
| 4,910,661 A | 3/1990 | Barth et al. | |
| 4,915,971 A | 4/1990 | Fennema et al. | |
| 4,985,260 A | 1/1991 | Niaura et al. | |
| 5,017,394 A | 5/1991 | MacPherson et al. | |
| 5,032,416 A | 7/1991 | Niaura et al. | |
| 5,035,907 A | 7/1991 | Phillips et al. | |
| 5,089,307 A | 2/1992 | Ninomiya et al. | |
| 5,286,502 A | 2/1994 | Meyers | |
| 5,334,404 A | 8/1994 | Garcia et al. | |
| 6,319,530 B1 * | 11/2001 | Stewart | 426/383 |

FOREIGN PATENT DOCUMENTS

| | | |
|---|---|---|
| DE | 3515075 | 10/1986 |
| EP | 236515 | 9/1987 |
| FR | 2640473 | 6/1990 |
| GB | 422430 | 1/1935 |
| GB | 543427 | 4/1942 |
| GB | 838948 | 6/1960 |
| GB | 2234422 | 2/1991 |
| JP | 55034966 | 3/1980 |
| JP | 5911136 | 1/1984 |
| JP | 59183654 | 10/1984 |
| JP | 60149366 | 8/1985 |
| JP | 6236151 | 8/1987 |
| JP | 63198958 | 8/1988 |
| JP | 63291538 | 11/1988 |
| JP | 1196259 | 8/1989 |
| JP | 2097357 | 4/1990 |
| JP | 2265435 | 10/1990 |
| JP | 6113746 | 4/1994 |
| JP | 6113788 | 4/1994 |

OTHER PUBLICATIONS

Bradshaw, D., "*The Sweet Taste of Good Ink*", Financ. Times. No. 31,305, Nov. 16, 1990, p. 14. (abstract only).

Anonymous, "*Laying It on the Line*", Food Prod. Nov. 1990, pp. 29–30, (abstract only).

Nakanishi, N., "*Future and Present of Edible Film*", Food Packag. Jpn). No. 5, May 1989, pp. 73–82. (abstract only).

Sweet, P., "*Graphics Enters the Jet Age*", Observer, Sep. 14, 1986, p. 42. (abstract only).

Baker's Helper, vol. 93, pp. 67–60 (May 13, 1950).

Dow Chemical Co., *Methocel Product Selection Guide*, (Jun. 1992).

Dow Chemical Co., *Methocel Cellulose Ethers Technical Handbook*, (Apr. 1988).

Kester and Fennema, *Edible Films and Coatings: A Review*: Food Technology (Dec. 1986).

Andres, ED Dir., *Edible Films have Potentional for Significantly Improving Aesthetic and Nutritional Content of Foods*, Food Processing (Jul. 1985).

Sample of Generically available Rice Paper, Dated more than one year from Jul. 7, 1993 for use in Cake Decoration.

Quick Frozen Foods, 5/64, pp. 34, 35, & 37.

Chiltons Food Engineering, 11/84, p. 88 (Dialog Abstract) (426/383).

Detroit Free Press Article, *Researcher's Rap: Eat a Sandwich and a Bag*, p. E3 (Dec. 30, 1993).

Tague Technologies, Inc., , *Edible Image*, Thronton, Co., (Information Sheet and Exemplary Photograph) (date Unknown).

Lucks Food Decorating Co. of Tacoma, WA, Edible Image (TM) product (first date unknown, but presumed on or about 1991).

Tops Foods Co., Ltd, *Manju Making*, Product Literature w/ translation and product sample; (Japan, date of first use unknown; knowledge/use presumed outside of the USA).

Polymer Films, Inc., *Edisol–M Film, EM 1100*, Facts Literature; 3 pages, (Rockville, Ct., date unknown).

Polymer Films, Inc., *EM 1100 Water Soluble Film*, Data Literature; 2 pages, (Rockville, CT; Jun. 1986).

* cited by examiner

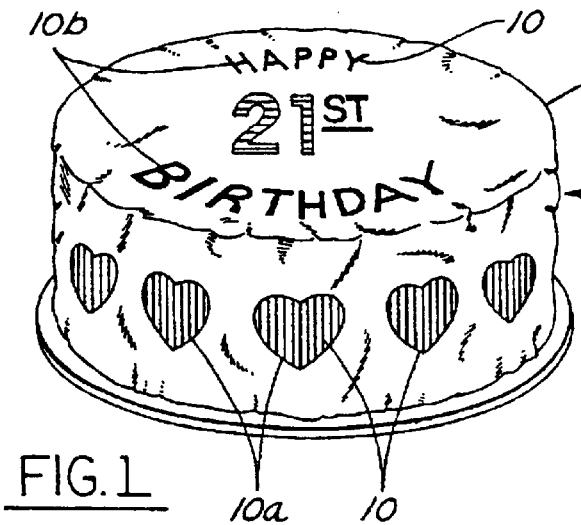
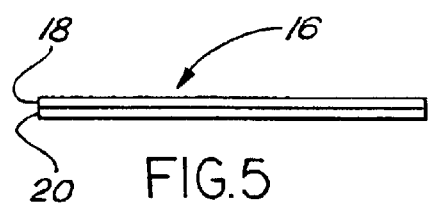
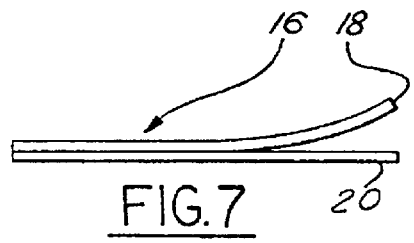
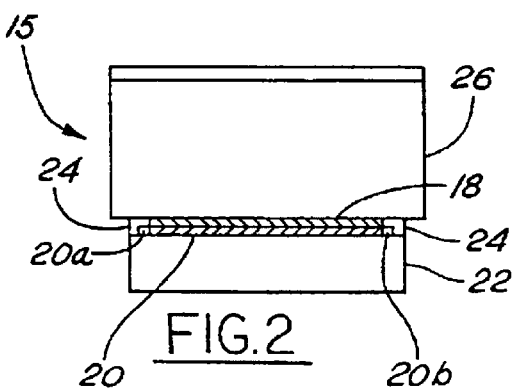
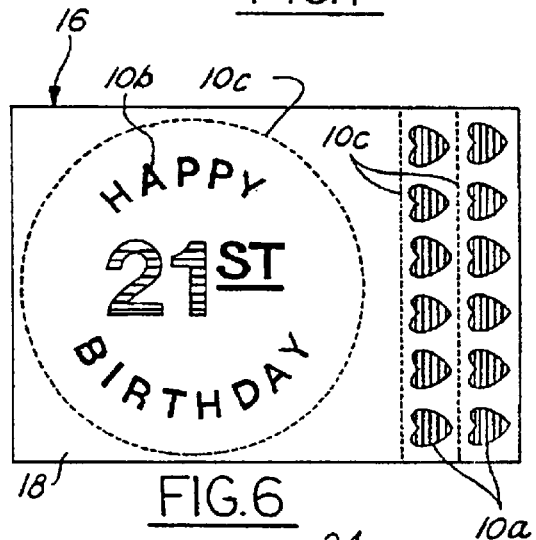
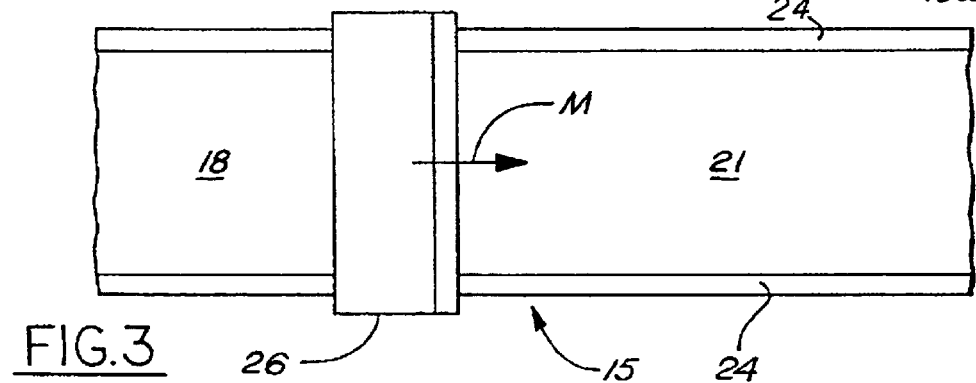
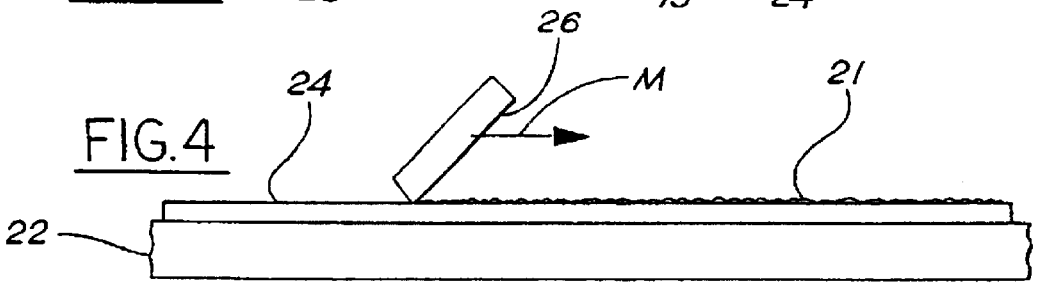

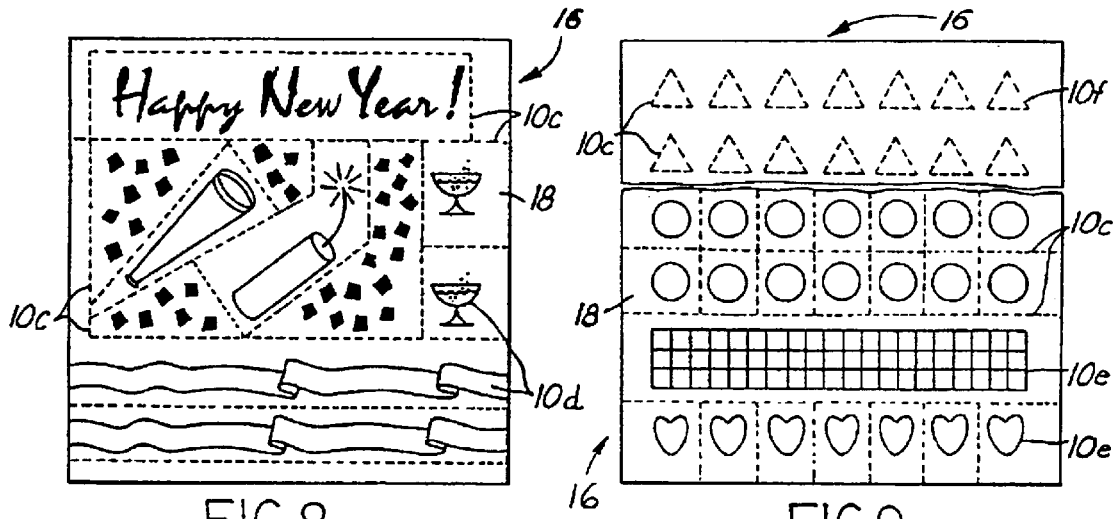
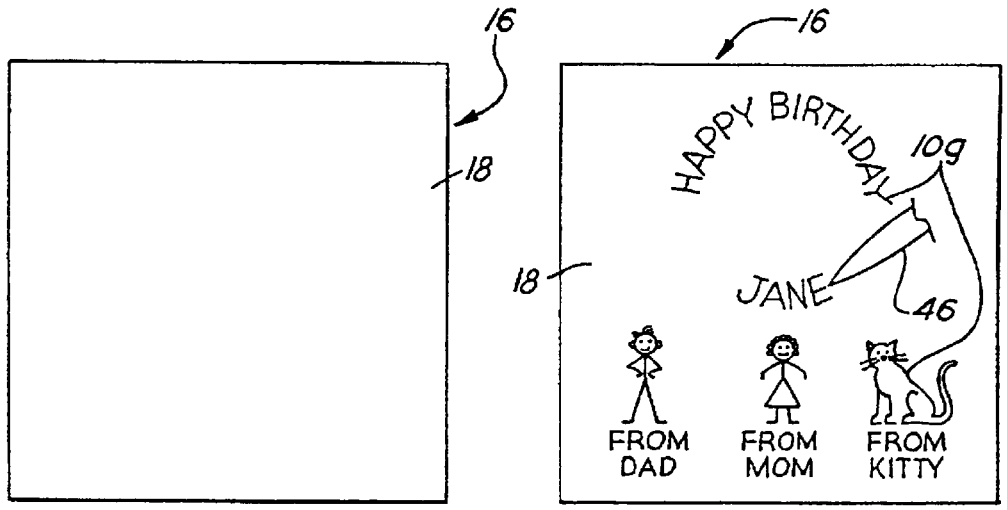
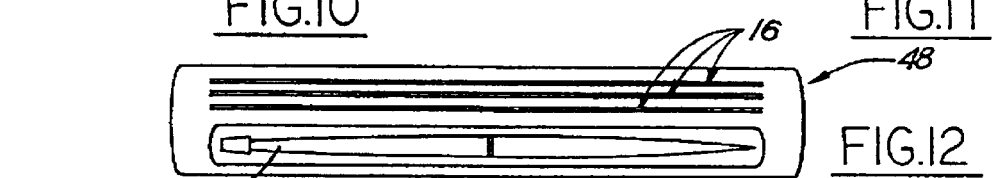
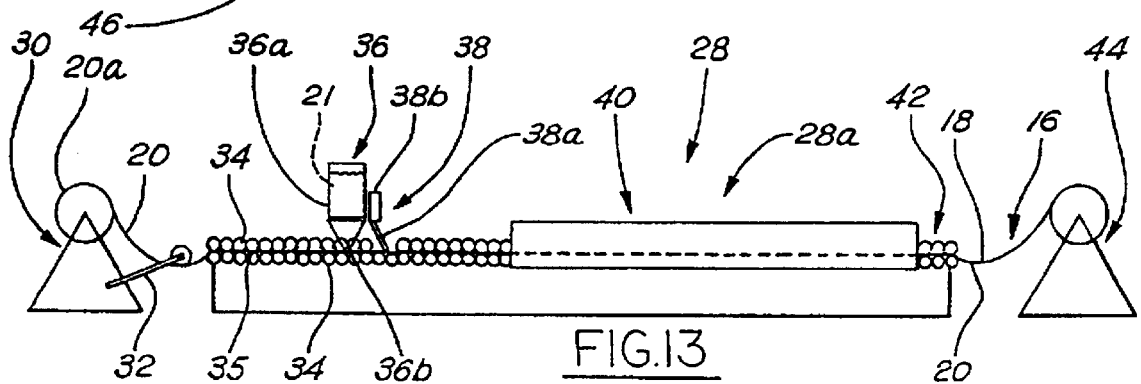

DECORATING A CAKE WITH A PRINTED EDIBLE SHEET BY USING AN INK JET PRINTER

RELATED APPLICATIONS

This application is a continuation of my U.S. application Ser. No. 08/471,761 filed Jun. 6, 1995, which is a divisional of application Ser. No. 08/088,125, filed Jul. 7, 1993, the disclosures of both of which are hereby incorporated herein in their entireties.

BACKGROUND OF THE INVENTION

I. Field of the Invention

The present invention relates to devices and methods used to decorate foodstuffs, particularly baked goods, such as for example cakes and pies. More particularly, the present invention relates to an edible film for decorating foodstuffs that is releasably adhered to a substrate, wherein the edible film is peelably released from the substrate and thereupon applied to the foodstuff. The edible film may be pre-printed with edible inks or may be written or drawn upon by the user such as for example by edible ink pens, may be colored, clear or selectively opaque, may be die-cut into pre-selected shapes or may be cut into selected shapes by the user.

II. Description of Prior Art

Foodstuffs, particularly baked goods, such as cakes, pies, cookies, and the like, are frequently decorated so as to present a pleasing presentation to those who are about to enjoy eating them. Especially on notable occasions such as a birthday, a holiday or a major life event such as a graduation or a wedding, cakes and other foodstuffs are ornately decorated in a manner consonant with the theme of the occasion.

The decoration of a special occasion cake, for example, usually involves an encompassing icing, artistic ornamentations of icing applied thereupon, and possibly one or more appliques of pictorialized icing. Clearly, only excellent results can be expected if the person applying the artistic ornamentations is a true artisan. And, the pictorialized icing is generally restricted to only generic occasions, but not for unique occasions, such as a person receiving a promotion at work. In any event, such beautifully decorated foodstuffs are rather expensive, and even more so when they are personalized.

Accordingly, it would be a significant advance in the foodstuff decorating art if foodstuffs could be beautifully decorated without the labor of an artisan or without expensive and occasion limited icing appliques.

In the prior art there have been various attempts at this noble goal, with greater and lesser degrees of success.

U.S. Pat. No. 3,852,494 to Williamson, dated Dec. 3, 1974, discloses a method and apparatus for decorating a confectionery item, such as a cake, wherein a stamp is vertically moved to kiss the icing surface and thereupon transfer an edible outline to the icing. Thereafter, an artisan manually fills-in the outline with an edible color fill material.

U.S. Pat. No. 4,024,287 to Golchert, discloses a process for decorating a confectionery item, such as a cake, wherein a design is traced onto a transfer medium, such as tissue paper. The transfer medium is then placed onto the confectionary item and a moist sponge placed thereover to cause the design to transfer onto the confectionary item.

U.S. Pat. No. 4,531,292 to Pasternack, dated Jul. 30, 1985, discloses an imaging process for decorating foodstuffs, wherein an image is received by an electronic image processor which thereupon generates drive signals to a scribing means. The scribing means includes a bridge that carries an electromagnetically actuated stylus which effects to inscribably transfer edible ink from a transfer sheet onto the foodstuff or an icing applique.

U.S. Pat. No. 4,578,273 to Krubert, dated Mar. 25, 1986, discloses a method f or printing upon foodstuffs, wherein a hard icing placed upon the foodstuff is color printed via a series of printings at successive print stations, each providing a different color.

U.S. Pat. No. 4,910,661 to Barth et al, dated Mar. 20, 1990, discloses an automatic decorating machine for applying flowable decorative materials to foodstuffs and other articles. A video image may be combined with artwork or characters as an input to an electronic circuit which then controls operation of liquid spray applicators and icing dispensers to provide a decorated foodstuff having decorations that are a facsimile of the input.

U.S. Pat. No. 5,017,394 to Macpherson et al, dated May 21, 1991, discloses a method for decorating foodstuffs, wherein an edible base shape is screen casted upon a carrier medium and thereafter printed upon preferably by a screen printing process. An apparatus is used to separate the base shape from the carrier medium so that the base shape may be thereafter applied to the foodstuff.

The various attempts at providing improved foodstuff decoration suffer from any or all of: reliance upon artisan labor, excessively complicated and expensive apparatus, or applications limitations.

Accordingly, what is needed is a universally applicable, simplistic and inexpensive provision for foodstuff decoration, which provision is easily and competently accessible to the average user.

SUMMARY OF THE INVENTION

The present invention is an edible film and method of using same for decorating foodstuffs, in particular baked goods, wherein anyone can easily, inexpensively and artistically decorate foodstuffs.

The edible film according to the present invention is composed of an edible polymer film which is preferably releasably mounted upon a flexible substrate to provide a reinforced edible film. The edible film is peelably released from the substrate to provide decorations for the foodstuff. The edible film may be decoratively prepared into predetermined decorations prior to distribution, which may include being pre-printed, pre-cut, colored, or being of pre-selected opacity and sheen. Pre-printing may be accomplished by any suitable printing process utilizing edible inks. Alternatively, the edible film may be distributed in a not yet finalized decoration form, wherein finalization is left up to the user. For example, the reinforced edible film may be distributed without being pre-printed or only partially pre-printed, wherein the user controls subsequent printing, writing, drawing or otherwise marking upon the edible film, such as by use of edible ink pens. Further, the user may purchase sheets of the reinforced edible film and thereafter cut the reinforced edible film sheets into shapes defined by the user.

The reinforced edible film may be distributed in the form of prepared decorating kits containing decorations for decorating foodstuffs generically for common occasions, which kits may further have provision for user modification for individualized preparation or finalization of the decorations. The reinforced edible film may be further made available for commercial preparation of personalized decoratively prepared edible film decorations.

In a first version of the method according to the present invention, an edible film is pre-printed utilizing edible inks into decorations. The pre-printing may be based upon any pictorial or graphic source, and may be generic or may be personalized. The user then releases the edible film from its flexible substrate and places the pre-printed edible film onto the foodstuff. For example, a happy birthday design on an edible film may be placed upon the icing at the top of a birthday cake.

In a second version of the method according to the present invention, an edible film is not pre-printed or is only partly pre-printed. The user places personalized markings upon the edible film utilizing edible ink, such as from edible ink pens. The user then releases the edible film from its flexible substrate and then places it upon the foodstuff, as recounted immediately above.

In yet a third version of the method according to the present invention, the user may cut the reinforced edible film into desired shapes or may use pre-cut shapes of the edible film, which after the edible film is released from the substrate, are then placed at decoratively pleasing locations on a foodstuff. The edible film may be pre-printed, colored or otherwise decorated so as to be decoratively distinguishable when placed upon the foodstuff.

Accordingly, it is an object of the present invention to provide an edible film and method of using same for decorating a foodstuff, wherein a user can accomplish artistically professional results inexpensively and without training or innate talent.

It is a further object of the present invention to provide kits for foodstuff decorations, wherein the kits contain pre-printed and pre-cut edible film decorations which may be applicable to generic or specific occasions.

It is another object of the present invention to provide kits for foodstuff decorations, wherein the kits contain non-printed or partly printed and non-cut or pre-cut edible film sheets or portions of sheets which are finalized by a user to form decorations which may be applicable to generic or specific occasions.

It is an additional object of the present invention to provide an edible film releasably adhered to a flexible substrate so as to provide a reinforced edible film that admits of rough handling, yet the film itself may be very delicate and gossamer.

It is still another object of the present invention to provide a reinforced edible film having structural integrity sufficiently suitable for printing thereupon by manual or automatic processes, yet when the edible film is peeled from the flexible substrate, the edible film becomes a decoration that is of such a delicate and gossamer quality that it is able to conjoin with the surface of the foodstuff in a manner that suggests the decoration alone and not the edible film basis therefor.

It is yet another object of the present invention to provide a foodstuff decoration which is applicable to a wide range of foodstuff decoration situations, wherein the decoration supplies a visual contribution thereto and may or may not contribute to the taste and masticatory feel of the foodstuff.

It is still a further object of the present invention to provide a reinforced edible film which is translucent sufficiently to enable a user to trace onto the edible film portion of the reinforced edible film a depiction constituting any picture, graphic, drawing, etc. that has been placed beneath the reinforced edible film.

These, and additional objects, advantages, features and benefits of the present invention will become apparent from the following specification.

BRIEF DESCRIPTION OF THE DRAWINGS

FIG. 1 is a perspective view of a foodstuff decorated using the reinforced edible film and method of use therefor according to the present invention.

FIG. 2 is a partly sectional end view of a manual forming apparatus for providing a reinforced edible film according to the present invention.

FIG. 3 is a top plan view of the manual forming apparatus depicted in FIG. 2.

FIG. 4 is a side view of the manual forming apparatus depicted in FIG. 2.

FIG. 5 is a side view of the reinforced edible film according to the present invention.

FIG. 6 is a top plan view of the reinforced edible film shown in the process of the edible film being peeled from the substrate.

FIG. 7 is a side view of the reinforced edible film of FIG. 6, wherein the edible film is being peeled from its releasable substrate.

FIG. 8 depicts pre-printed and pre-cut decorations for a specific occasion utilizing the reinforced edible film according to the present invention.

FIG. 9 depicts two examples of reinforced edible film: the upper example is a colored reinforced edible film having a number of pre-cut decorations for a generic occasion; the lower example is a reinforced edible film having pre-cut, pre-printed decorations for a generic occasion.

FIG. 10 depicts a blank reinforced edible film according to the present invention which may be user marked upon and user cut.

FIG. 11 depicts a reinforced edible film as depicted in FIG. 10, wherein the edible film is shown being custom marked upon by a user.

FIG. 12 is a kit containing sheets of the reinforced edible film which may be pre-printed, blank, pre-cut, uncut, colored, clear, of selected opacity, of selected sheen, or same combination thereof, and also including a number of edible ink writing instruments.

FIG. 13 is a schematic of an automated forming apparatus for providing the reinforced edible film according to the present invention.

DETAILED DESCRIPTION OF THE PREFERRED EMBODIMENT

Referring now to the Drawings, decorations 10 made according to the method of the present invention are shown operatively located on the icing 12 of a foodstuff 14 in the form of a cake. In this regard, it will be noted that the decorations 10 appear to be integral with the icing 12 and are decoratively arranged in a manner determined by a user. In the exemplification depicted in FIG. 1, the user selected decorations 10 in the form of hearts 10a which the user placed alignably around the side of the cake, and further placed pre-printed lettering 10b which is specific to an occasion (in this case a twenty-first birthday) to the top of the cake.

In order to accomplish the aforesaid decorative effect on the foodstuff 14, the user utilized a reinforced edible film 16 composed of an edible film 18 which is releasably attached to a flexible substrate 20 (see FIG. 5). The edible film has been cut and the edible film printed upon to provide the decorations 10a, 10b depicted in FIG. 1. The edible film 18 is itself sufficiently gossamer so as to unobtrusively meld into the icing 12, while the substrate 20 provides sufficient structural integrity for the edible film so that it may be easily and effectively processed into a decoration, such as for example printing and cutting thereof.

The edible film 18 is preferably a water soluble polymer film, such as that manufactured by Dow Chemical Company of Midland, Mich. under the trademark METHOCEL. METHOCEL encompasses a range of both methylcellulose and hydroxypropyl methylcellulose in a wide range of viscosities, hydroxypropyl methylcellulose being preferred. However, other kinds of edible films known in the art may be used.

The substrate 20 is a food product compatible, flexible sheet which has the properties of releasably adhering to the edible film 18 in a manner that admits of hand peeling and further of providing mechanical handling integrity for the edible film so that the edible film may be processed, such as by printing and cutting, into a decoration. An example of an acceptable substrate 20 is mylar, preferably 3 mil DuPont EB-II mylar sheet. Other food product compatible substrates may be used.

A preferred method of preparing the preferred edible film 18 is as follows.

Firstly, a solution 21 of edible film material must be provided. In the case of hydroxypropyl methylcellulose, the following steps are suggested by Dow Chemical Company which makes use of the principle that hydroxypropyl methylcellulose is insoluble in hot water: disperse in water the hydroxypropyl methylcellulose product using ⅕ to ⅓ the required total amount of water as hot water (176 to 194 degrees F.) while agitating the water, upon thorough wetting of the hydroxypropyl methylcellulose particles, the remaining water is added as cold water while continuing agitation, after a smooth solution has been obtained at less than 77 degrees F. the agitation is continued for approximately 20 minutes. The ratio of hydroxypropyl methylcellulose to water is predetermined to arrive at a preselected viscosity of the resulting edible film.

Additional ingredients may now be stirred into the solution, one at a time, so that the final properties of the edible film formed therefrom are as desired. For example, the following additives may be added to the solution. A plasticizer, such as propylene glycol may be added to control elasticity of the edible film, to control adhesion of the edible film to the substrate, and to provide variation in surface sheen of the edible film. Starch may be added to build edible film body, to control opacity thereof and to provide variation of surface sheen of the edible film (it tends to create a matte finish). A colorant in the form of an approved food color controls the color of the edible film. A flavoring in the form of an approved food flavor, such as for example oils, extracts and artificial flavors, controls the taste of the edible film.

Examples of solutions 21 for providing the preferred edible film 18 are as follows.

Example 1, for providing a clear edible film:

18 grams of hydroxypropyl methylcellulose;
1 ml of propylene glycol; and
240 ml of water.

Example 2, for providing a colorless and opaque edible film:

18 grams of hydroxypropyl methylcellulose;
1 ml of propylene glycol;
245 ml of water; and
12 grams of starch.

-continued

Example 3, for providing a pink and translucent edible film:

18 grams of hydroxypropyl methylcellulose;
0.5 ml of propylene glycol;
235 ml of water; and
5 ml of food coloring composed of:
  water, propylene glycol, and
  FD&C Red #3.

Example 4, for providing a black and opaque edible film:

18 grams of hydroxypropyl methylcellulose;
1 ml of propylene glycol;
240 ml of water;
4 grams of starch; and
10 ml of food coloring composed of:
  water, propylene glycol, and
  FD&C Blue #1, Red #3,
  Yellow #5 and Yellow #6.

Example 5, for providing a yellow and opaque, lemon flavored edible film:

20 grams of hydroxypropyl methylcellulose;
1 ml of propylene glycol;
240 ml of water;
4 grams of starch;
2 ml of lemon extract;
2 grams of sweetener (aspartame); and
10 ml of food coloring composed of:
  water, propylene glycol, and
  FD&C Red #40 and Yellow #5.

Next, the solution 21 is formed into a film geometry upon the substrate 20. This is accomplished by either a manual forming apparatus 15 (see FIGS. 2 through 4) or by an automated forming apparatus 28 (see FIG. 13).

The manual forming apparatus 15 includes a glass base 22 which lays horizontally on a surface (not shown) such as a table. The substrate 20 is laid upon the glass base 22 and the edges thereof, including opposite edges 20a, 20b, are taped by a mylar tape 24 having a non-permanent adhesive to the glass base 22. The thickness of the tape 24 defines the thickness of the edible film 18 to be formed. Accordingly, the thickness of the edible film is controlled by varying the tape thickness itself or by adding or subtracting layers of the tape. A thickness range of between 0.0004 to 0.0015 inch is preferred for providing unobtrusively thin, gossamer edible films. Thicker edible films can provide more flavor and provide greater mechanical strength for manipulation by a user. A glass wiper 26 is placed edgewise onto the tape 24 at each edge 20a, 20b of the substrate 20 so as to be slidable therealong. A preselected quantity of solution 21 is poured onto the substrate 20 and starting from one end of the substrate 20, the wiper 26 is wiped along the tape 24 in the direction indicated by arrow M while being inclined acutely (approximately at 45 degrees to the substrate) in the direction of the wiping movement. The speed of movement is maintained so that the solution 21 is formed into a uniform film geometry as the wiper 26 slides on the tape 24.

The solution 21 now having a film geometry must be dried. Drying may take 12 to 14 hours in room temperature ambient air, but the drying time may be shortened significantly by increasing air temperature and circulation. The tape 24 may be removed at any time. Upon the completion of edible film drying, the result is a reinforced edible film 16 in the form of an edible film 18 releasably adhered to a substrate 20, as shown in FIG. 5.

The automated forming apparatus 28, shown in FIG. 13, provides commercial quantities of the reinforced edible film 16. The process line 28a is logically controlled, as for example by a programmable logic controller, such as an Allen-Bradley SCL 500. Programmability allows flexibility in adjusting sequencing, process line speed, etc., via a personal computer and software interface.

The substrate 20 is provided as a coil 20a and is decoiled at a decoiler station 30. The decoiler station 30 preferably provides two coil positions, one in a process position on-line and one in a reload position off-line. The two positions alternate as the decoiler station 30 is allowed to shift transverse to the process line 28a. This effects to reduce idle manufacturing time while reloading a new substrate coil, so that one is always in the process position. An example of a coil 20a of substrate 20 in the form of DuPont 3 mil EB-II mylar film has a width of between 18 and 55 inches and a length of 6,200 feet. The decoiler station 30 is electrically driven preferably by a DC drive and is asynchronous to the process line drives.

A tension arm 32 provides a buffer between the coil drives and the process drives. The tension arm 32 is structured to maintain constant tensioning of the decoiled portion of the substrate coming off the substrate coil 20a.

The substrate 20 is drawn up to the process line by cushioned, spring tensioned wheels 34 which are arranged in two opposing rows, one on either side of the substrate, so as to supply a pinching force to the substrate as it passes thereby. The wheels 34 contact about 1 inch of the substrate surface, upper and lower. The substrate 20 is supported between the rows of wheels 34 by a flat teflon coated plate surface 35 to prevent sagging of the substrate as it is transferred.

A casting station 36 is provided, consisting for example of a 50 gallon tank 36a holding the solution 21 overhead the substrate 20. A plurality of nozzles 36b, such as for example 10 nozzles uniformly spaced across the width of the substrate 20, are solenoid operated to allow gravity feed of the solution 21 from the tank 36a to the substrate 20. The solenoids are logically controlled to meter the solution flow rate at the nozzles 36b so as to conform with line speed as based upon the rate of rotation of the drive wheels 34.

A plurality of casting stations may be located sequentially along the process line 28a so as to provide ready change in the solution formulation so as to minimize line disruption.

Trailing the casting station 36 is a forming station 38. The forming station 38 provides for leveling, smoothing and thickness control of the edible film 18 being formed from the dispensed solution 21. A wiper 38a in the form, for example, of a single plate of tempered glass is located transverse to and overhead the substrate 20. The overhead location is controlled by finely threaded screws with respect to a stationarily affixed mounting bracket 38b, which overhead location relative to the substrate 20 determines the thickness of the edible film 18. The edible film 18 is formed as the substrate 20 passes beneath the wiper 38a and is thereupon leveled and smoothed. The wiper 38a is inclined with respect to the substrate 20 at an acute incoming angle, preferably of around 45 degrees.

Next, a dehydration tunnel 40 provides filtered and heated air in forced circulation adjacent the drying, newly formed edible film 18. The temperature and rate of air circulation is controlled to adjust to line speed and solution formulation.

After the dehydration tunnel 40, the now more-or-less dried edible film 18 is ambiently dried and cooled at a finishing station 42, resulting in a finished reinforced edible film 16.

Lastly, the reinforced edible film 16 is either rolled or cut to size at a final processing station 44. The edible film 18 may thereafter be die cut to provide decoration defining score lines and/or the edible film may be imprinted at one or more adjacent in-line stations; otherwise, the reinforced edible film 16 may be taken elsewhere for storage, shipping or further processing.

Turning now to FIGS. 6 through 13, the method of use of the reinforced edible film 16 will now be detailed.

FIGS. 6 and 7 show how the foodstuff 14 was decorated using the reinforced edible film 16. FIG. 6 shows a sheet of the reinforced edible film 16, wherein the edible film 18 has been imprinted with the edible ink design of the top decoration 10b and the side decorations 10a. The edible film 18 has a die cut score 10c which defines the top decoration 10b. The user removes the edible film 18 carrying the top decoration 10b from the substrate 20 by starting peeling at the score line 10c by using his or her fingernail, which may be facilitated by gently folding the substrate at the score line 10c, to peel the top decoration 10b off from the substrate 20, as shown in FIG. 7. The user then places the top decoration 10b onto the top of the foodstuff 14 in a pleasing placement thereupon, as shown in FIG. 1. The side decorations 10a are provided in strips having die cut score lines 10c which define rows of decorations that facilitate side-by-side alignment of the decorations around the side of the foodstuff 14. The edible film portions carrying the side decorations 10b are manually peeled off from the substrate 20 with the initial aid of the user's fingernail by either gently folding the substrate at the score line 10c or starting peeling at the edge and then peeling off the edible film from the substrate in the same manner as shown in FIG. 7. The decoration 10b is then placed upon the side of the foodstuff 14 as shown in FIG. 1. It will be understood that preferably the edible film 18 is gossamer, wherein its thickness is sufficiently thin so that it basically disappears as against the foodstuff 14, which in this case is the icing 12 thereof. In this regard, moisture of the foodstuff 14 transfers to the edible film 18, causing adherence of the edible film to the surface of the foodstuff without destroying the edible film in the process. Accordingly, an incredibly professional foodstuff decoration has been effected independent of the discretionary income and artistic acumen of the user.

FIGS. 8 through 12 show variations of methods of using the reinforced edible film 16. FIG. 8 depicts a reinforced edible film 16 having a pre-printed, pre-cut (see score lines 10c) edible film 18 in the form of finalized decorations 10d for use at a specific occasion. FIG. 9 depicts two examples of sheets of reinforced edible film 16. The upper example depicts a sheet of reinforced edible film 16 having a colored edible film 18 with pre-cut (see score lines 10c) decorations 10f for use at a generic occasion. The lower example depicts a sheet of reinforced edible film 16 having an edible film 18 that has pre-printed, pre-cut (see score lines 10c) decorations 10e. FIG. 10 depicts a non-printed, uncut sheet of reinforced edible film 16 for any occasion, in which the edible film 18 is to be printed upon by a user and the reinforced edible film cut by the user so as to provide user finalized decorations 10g, such as depicted in FIG. 11. With regard to FIG. 11, the user is utilizing a writing instrument 46, preferably a pen of the felt tip variety, having contained therein colored edible ink to draw the decorations 10g. The process depicted in FIG. 11 shows the decorations being free-hand drawn by the user. The user could also have traced the decorations by placing the reinforced edible film 16 over some depiction, and then following the outlines or features of the depiction visibly through the reinforced edible film.

It is also possible to supply the reinforced edible film 16 with the edible film 18 partly pre-printed, wherein the user finalizes the decoration by marking upon it. For example, the top decoration 10*b* shown in FIGS. 1 and 6 may have only the generic words "HAPPY BIRTHDAY" and the user writes in the celebrant's age, in this case the numeral "21".

It is also possible for sheets of reinforced edible film 16 as depicted in FIG. 10 to be utilized by printing facilities to produce generic and/or personalized printing upon the edible film 18. The printing may include special messages, pictures and/or drawings, other source materials or any combination thereof. Because of the substrate 20, the printing facility can handle the reinforced edible film 16 similarly to the way it would handle paper, thus making available practically any printing machine and printing method for creating decorations, provided, of course, edible inks are used.

Finally, FIG. 12 depicts a kit 48 for use to decorate a foodstuff, such as for example a cake. The kit 48 contains a plurality of sheets of reinforced edible film 16, which may include, for instance, colored, flavored, tasteless, opaque, or clear edible films and may further include pre-printed and/or pre-cut edible films for purposes consonant with an identified occasion. The kit 48 optionally includes a plurality of assorted colored edible ink writing instruments 46, which are preferably of the felt tip pen variety for user utilization as generally depicted in FIG. 11.

Over-all, the following advantages of the reinforced edible film and the method of its use are:

1. The edible film can be made very thin, on the order of 0.0004 inches, wherein it is so gossamer that it will essentially disappear when applied to a foodstuff, yet the substrate will give it mechanical workability while it is being fashioned into a decoration.
2. The edible film may be mass produced and easily stored over long periods.
3. The edible film may be clear, colored, opaque or anything in between. This facilitates pre-printing and user marking upon the edible film (such as for example by printing, writing or drawing upon it). It also facilitates pre-cut and user cut design shapes of the edible film being decorative in their own right.
4. The edible film may be easily die cut to provide score lines that at least in part define the areal definition of decorations while the substrate is not cut. Gentle folding of the substrate at the score line permits a user to easily use his or her fingernail to begin the peeling of the edible film from the substrate. Alternatively, if available, the user may use his or her fingernail to begin peeling at the edge of the edible film.
5. The reinforced edible film may be easily cut with scissors or a knife by a user, and the user may even use a razor blade or razor knife to cut through only the edible film and not cut through the substrate when defining the areal extent of the decorations being finalized.
6. The edible film may be tasteless or flavored, thereby enhancing the taste of the foodstuff, or simply unaffecting its taste.
7. The substrate facilitates handling of the edible film in a manner customary of paper, yet the edible film itself may be extremely delicate. The edible film may be placed into conventional printing presses, pen plotters, ink jet printers, silk screen printers, and so on, and may be hand marked upon, rubber stamped, etc. Yet, easy manual release of the edible film from the substrate makes the edible film itself simply accessible when it is time to apply it to a foodstuff.
8. The reinforced edible film may be supplied in sheets wherein the substrate delivers the mechanical rigidity that is appropriate for user defined shape cutting.
9. The reinforced edible film may have pre-printed, partly printed or non-printed edible film, wherein the user may add or supply user defined marking thereupon.
10. The reinforced edible film may be sufficiently translucent so as to enable a user to trace onto the edible film portion of the reinforced film a depiction constituting any picture, graphic, drawing, etc. that has been placed beneath the reinforced edible film.
11. The reinforced edible film may be supplied in kit form for a user to customize the decoration of foodstuffs, wherein the kit may include a plurality of assorted reinforced edible film sheets and edible ink writing instruments.
12. The reinforced edible film may be utilized by commercial businesses to transfer newly created or user supplied video, photographic, computer generated images, text, graphics or other source to the edible film and then present the decorated reinforced film to the user customer. This can even be performed on a mail order basis.
13. The edible film carrying the decoration will absorb moisture from the surface of the foodstuff upon which it is placed and thereupon adhere to the foodstuff without the edible film being destroyed thereby.

It is to be understood that the edible film may be used alone without the substrate for purposes of providing foodstuff decorations in the manner as outlined hereinabove, and that reinforced edible films are described herein only by way of preferred example. Further, the term "marking" is to be understood to mean causing any kind of indicia to be placed upon the edible film, such as, for example, by printing, writing, drawing, or any other image transfer means, and may include causing selected additives in the edible film solution to produce patterns in the dried edible film.

It is to be further understood that the edible film and method of use therefor may be used with any foodstuff, including, but not limited to confectioneries, inclusive of candies and ice creams. Further, foodstuffs ordinarily not having surface moisture sufficient to adherably hold the edible film thereto may be supplied by the user with the requisite surface moisture. For example, spraying water upon the surface of a dry foodstuff can supply sufficient moisture so that the edible film 18 adheres to the surface of the foodstuff.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method of decorating an iced cake, by using an ink jet printer, with a pictorial image provided by a customer, comprising:

obtaining a plurality of separate, flat edible sheets, each sheet being supported and reinforced on its own associated flat substrate such that because of the substrate, the printer can handle the supported, reinforced, edible sheet similarly to the way it would handle paper;

obtaining a pictorial image from the customer;

placing one of the edible sheets and its associated substrate into an ink jet printer for handling the edible sheet and substrate in a manner customary of paper;

reproducing on the one edible sheet with the ink jet printer a copy of the pictorial image obtained from the customer, by printing thereon with edible inks to thereby decorate the edible sheet;

removing the decorated edible sheet from the associated substrate; and placing the decorated edible sheet on the iced cake to thereby decorate same.

2. The method of claim 1 further comprising obtaining the edible sheets in an opaque state.

3. The method of claim 1 further comprising marking the decorated edible sheet with an additional decoration.

4. The method of claim 1 further comprising obtaining the plurality of separate, flat edible sheets from a first location and obtaining the pictorial image from the customer at a second location, remote from the first location.

5. The method of claim 4 wherein the second location deals with the customer, the method further comprising having the plurality of edible sheets shipped from the first location to the second location.

* * * * *